Figure 4:
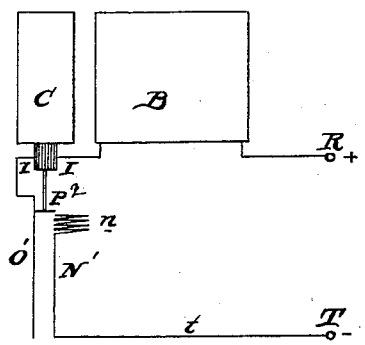

(No Model.) 2 Sheets—Sheet 1.
R. M. HUNTER.
ELECTRIC REGULATOR.
No. 560,035. Patented May 12, 1896.
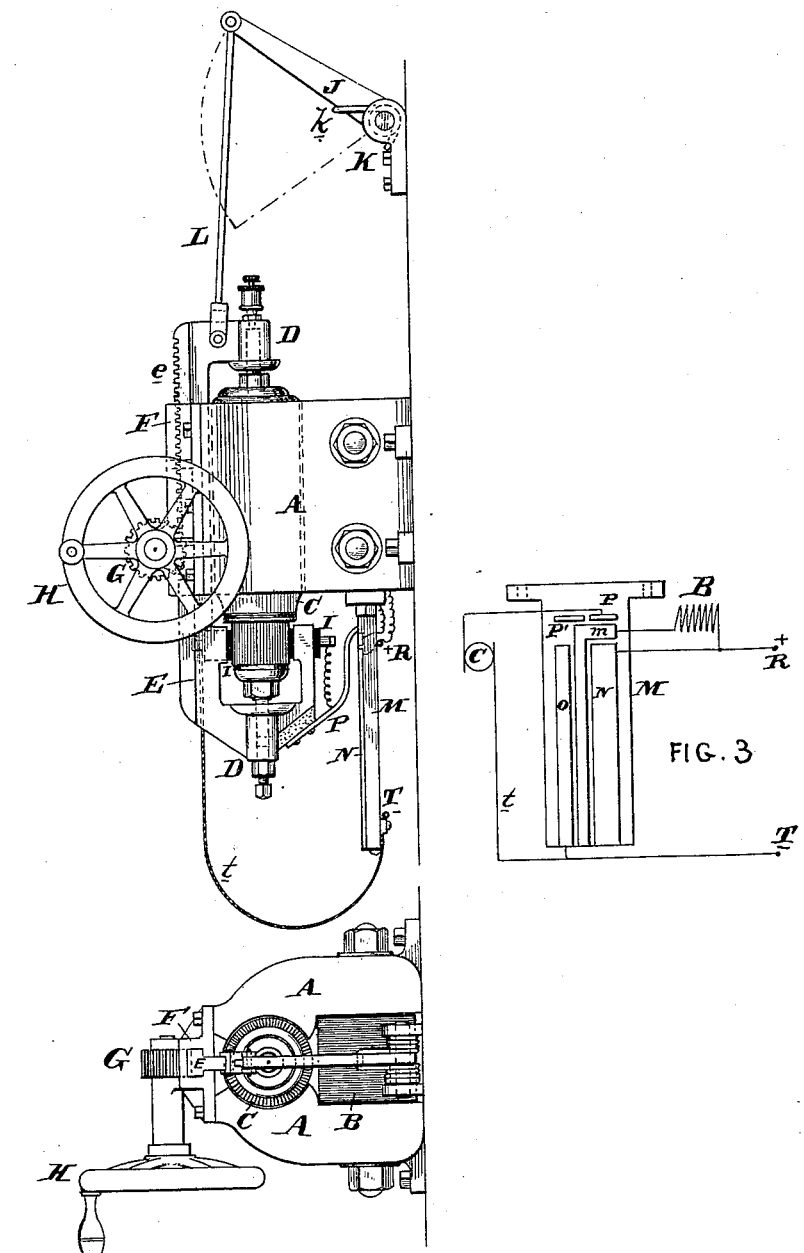
FIG. 1.
FIG. 2.
FIG. 3.
Attest
H. L. Motherwell.
Hn. L. Evans.
Inventor

(No Model.) 2 Sheets—Sheet 2.
R. M. HUNTER.
ELECTRIC REGULATOR.

No. 560,035. Patented May 12, 1896.

Attest
L. L. Motherwell.
Wm. L. Evans.

Inventor

UNITED STATES PATENT OFFICE.

RUDOLPH M. HUNTER, OF PHILADELPHIA, PENNSYLVANIA.

ELECTRIC REGULATOR.

SPECIFICATION forming part of Letters Patent No. 560,035, dated May 12, 1896.

Application filed May 22, 1894. Serial No. 512,052. (No model.)

*To all whom it may concern:*

Be it known that I, RUDOLPH M. HUNTER, of the city and county of Philadelphia and State of Pennsylvania, have invented an Improvement in Electric Regulators, of which the following is a specification.

My invention has reference to regulators for electric motors; and it consists of certain improvements, which are set forth in the following specification and shown in the accompanying drawings, which form a part thereof.

This application (Case No. 276) has particular reference to means to control a current flowing through an electric motor for the purpose of varying its speed and power.

The principle involved in my improved regulator comprehends the varying of a counter electromotive force independent of that of the power-motor, which counter electromotive force may be employed in a circuit either in series or shunt relation with the electric power-motor to control the current flowing through said power-motor.

In carrying out my invention I employ a regulating device in the form of a small motor having an armature and field relatively movable with respect to each other, whereby they may have a greater or less amount of wire or conductors in inductive relation relatively one to the other for the purpose of varying the counter electromotive force which may be produced thereby. In my preferable construction the field-magnets are stationary and the armature is made movable in the direction of its axis, so that a greater or less quantity of the wire of said armature may be brought into inductive relation with the poles of the field-magnets. The armature is adapted to revolve freely and to perform no other work than to rotate itself, and consequently it responds to the smallest current. Its speed may be exceedingly great. The advantage of this great speed is that the armature may be made small and have few conductors, because the counter electromotive force is proportional to the speed and may therefore be caused to equal the initial electromotive force of the line-circuit without difficulty. I prefer to employ in connection with the movable armature a suitable switch which shall properly control the circuits of the regulator to give the greatest amount of resistance prior to its obtaining its speed or when putting the regulator into operation, so as to prevent an excess of current passing through the coils of the regulator before it is in operation to generate a counter electromotive force sufficient to be self-protecting. It will be readily understood that as the armature revolves freely no current can be passed through the armature sufficient to endanger it, because an abnormal increase of current instantly produces a correspondingly-increased speed and production of the necessary counter electromotive force to shut off the passage of what would otherwise be a dangerous current. There are many modifications possible under the general construction embodying the principles of my invention, and these will be better understood by reference to the accompanying drawings, in which—

Figure 5:
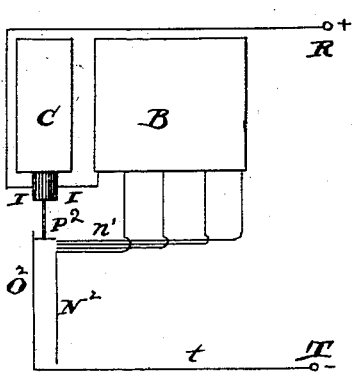
Figure 8:
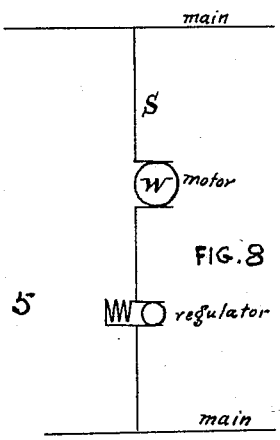
Figure 6:
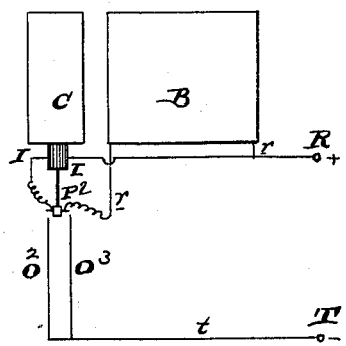
Figure 7:
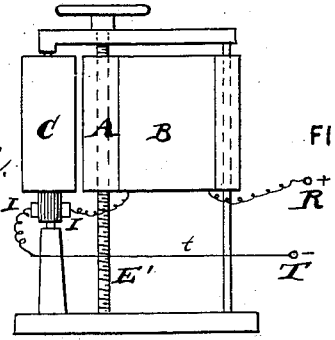

Figure 1 is a side elevation of my improved regulator for electric motors. Fig. 2 is a plan view of the same. Fig. 3 is a diagrammatic view of the switch. Figs. 4, 5, and 6 are diagrams illustrating modifications of the circuits. Fig. 7 is a side elevation of a modified form of my regulator where the field-magnets are adjustable instead of the armature, and Fig. 8 shows my invention applied to a constant-potential circuit wherein the motor is arranged in parallel with the translating devices.

A are the field-magnets, and are preferably stationary. B are the wire coils of the field-magnets. These field-magnets may be made in any suitable manner desired.

C is an armature, and revolves freely in bearings D D, formed on a frame E, which is adjustable vertically in guides F, bolted to the field-magnets A. The frame E is provided with a rack $e$, with which a pinion G meshes, the said pinion being journaled in the frame F and is operated by the hand-wheel H. By rotating the hand-wheel H in one or the other direction the frame E may be raised or lowered, and with it the armature C, so as to move it into and out of, to a greater or less extent, the inductive field of the poles of the field-magnet.

When the armature is in the position shown in Fig. 1, the circuit is broken by the switch P, but upon lowering the armature to a slight extent the circuit will be closed, and the armature will be in the greatest inductive relation relatively to the field.

By examining Fig. 3 it will be observed that the current comes from a positive circuit R, and then passes through the field-magnets B of the regulator to a contact $m$, supported by and insulated from the frame M. Immediately below the upper portion of the contact $m$ is a contact-strip N, and parallel to it is a second contact-strip O. The contact-strip N is directly connected with the positive terminal R, and the parallel contact-strip O is connected with the negative terminal T.

P P' are two contacts carried with the frame E, the contact P of which connects with one of the brushes I of the armature C, and the other brush I of said armature connects with a flexible conductor $t$ leading to the negative terminal T. The contact P in descending with the armature first closes the circuit with the contact-block $m$, and then with the contact-strip N. The contact P' on the other hand has no connection directly with any of the circuits, but in descending simultaneously with the contact P closes a circuit between the parts $m$ and O. The operation of these circuits will now be understood. When no current is flowing, the several parts are in the relation shown in Fig. 3. As the hand-wheel H is turned the armature C is lowered slightly, and when the contact P comes into connection with the parts $m$ the electric circuit is closed through the field-magnets B and armature C in series. If the field-magnets are of high resistance, as I prefer to make them, a limited amount of current alone will be permitted to flow, and while this would not be sufficient to impart to the armature any great power it is sufficient to give it a considerable speed, inasmuch as it is doing practically no work. The speed having thus been secured, the further lowering of the frame E moves the contact P off of the contact part $m$ onto the contact-strip N, and simultaneously therewith the contact P' closes the circuit between the parts $m$ and O. This instantly throws the field-magnet coils B of the regulator into parallel or shunt relation with respect to the armature. The armature C will, when this action is secured, be in practically its best condition for inductive action by the field, and the speed may then be brought to a maximum with the generation of the largest counter electromotive force, and when practically no current is flowing through the regulator.

If it is desired to permit some current to flow, the hand-wheel H is turned and the armature is lowered to remove it to a greater or less extent out of inductive relation with the field, so as to lower its speed and counter electromotive force. In all of the subsequent adjustments the field-magnets are kept in shunt relation relative to the armature.

To enable the armature to be moved freely up and down and to remain in any position in which it is placed, I prefer to counterbalance it in some suitable manner, one method being illustrated. The construction of the counterbalancing device shown consists of a pivoted arm J, hinged to a bearing K and connected at its outer end by a link L with the frame E. A spring K' is employed to raise the arm J and thus counterbalance the weight of the armature and the frame E. It is evident that any other suitable device may be employed in lieu of that shown.

In the use of this invention for street-railways or on constant-potential circuits, where the motors or translating devices are operated in parallel, it is preferable to use the improvement in series with the power motor or motors, but in case of motors operating upon constant-current circuits it is preferable to use the regulator in shunt relation with the power-motor, but in that case the field-magnet coils should remain in fixed relation to the armature and the circuit should never be broken by the contacts P P', as that would interfere with the operation of the various translating devices connected in series with the source of power.

Referring now to some of the modifications of my invention, Fig. 4 illustrates the field-magnet coils B in series with the armature C and a contact $P^2$ operating with the armature to control the current passing through the field-magnets and armature by means of the contact-strips O' and N' and resistances $n$. Upon lowering the armature the circuit will be closed through the resistances $n$, and a slight further lowering of the armature successively cuts out these resistances, and when the speed is secured the armature is connected through parts O', $P^2$, and N' directly with the main circuit. In this case the field-magnets B have a low resistance, whereas in the case shown in Figs. 1 and 2 the field-magnets have a high resistance.

In Fig. 5 we have the field-magnets and armature in series, as before, but in this case the field-magnet coils are connected at intervals to terminals $n'$ and $N^2$, which are brought successively into electrical connection with the contact-strip $O^2$ by the contact-switch $P^2$, operated by the armature C. As shown, circuit is broken, and as armature C is lowered the current is first sent through all of the field-magnet coils B to obtain the greatest resistance, and gradually the said coils are cut out until only a small quantity of said coils are maintained in circuit by the contact-strip $N^2$, which is of a length sufficient to permit the full raising and lowering of the armature C into and out of inductive relation with the field-magnets. The construction in Fig. 5 differs from that of Fig. 4 in the field-coils B being so made as to cause current passing through the resistances to aid in producing the magnetic field to quickly generate a counter electromotive force.

In the construction shown in Fig. 6 we have the armature C in permanent shunt relation with the field-coils B, the said field-coils being in a shunt-circuit $r$. The contact-switch $P^2$ may move with the armature C and operate in connection with the contact-strips $O^2$ O³, so as to maintain the armature and field-coils in shunt relation, but to close the circuit through the field-coils slightly in advance of the armature for the purpose of producing a magnetic field before any current is sent through the low-resistance armature. In this case the field-coils are of much higher resistance than the armature.

In Fig. 7 we have the field-magnet coils B in series with the armature C, and in this case no switch devices have been shown, but might be similar to any of those illustrated. In this case, however, they would be operated by the movable field-magnets A, which field-magnets are adjustable vertically relative to the armature by a screw E' or other suitable device. It is evident that the same result will be obtained by adjusting the field-magnet relatively to the armature; but the construction is not as preferable, owing to the fact that the field-magnets form an excellent support or base for the general apparatus and are much heavier than the armature.

In the construction shown in Fig. 8 it is evident that the regulator, being in series with the power-motor W, directly opposes the initial electromotive force of the line existing in the branch circuit S, connecting the two mains, and this counter electromotive force may be varied as desired without affecting the operation of any of the current consuming or translating devices in other parallel circuits between the mains.

My improved regulator may be employed either in series or shunt relation relatively to the motor to be regulated; but the specific arrangement of its shunt relation is not specifically claimed in this application, as it forms subject-matter of my application, Serial No. 575,197, filed January 13, 1896.

In this application I do not claim the generic invention of regulating an electric motor by interposing in the line-circuit a variable counter electromotive force produced by induction, as that forms subject-matter of my applications, Serial No. 469,709, filed April 10, 1893, and Serial No. 497,024, filed January 16, 1894, nor to the generic invention of regulation by counter electromotive force, broadly, outside the power-motor, as that forms subject-matter of my application, Serial No. 556,552, which is a division of my application, Serial No. 208,418, filed July 19, 1886.

While I prefer the construction shown, I do not limit myself to the details thereof, as they may be modified in various ways without departing from the principles of my invention.

Having now described my invention, what I claim as new, and desire to secure by Letters Patent, is—

1. The combination of a line-circuit, an electric power-motor in said circuit, and a variable-counter-electromotive-force generator interposed in the line-circuit and generating a counter electromotive force opposed to the initial electromotive force of the line-circuit consisting of a revolving armature, field-magnets for producing a field in the vicinity of the armature, and means for shifting the armature relative to the field-magnets or vice versa for producing a variation in the inductive relation between the armature and the field-magnets.

2. The combination of a line-circuit, an electric power-motor in said circuit, and a variable-counter-electromotive-force generator interposed in the line-circuit and generating a counter electromotive force opposed to the initial electromotive force of the line-circuit consisting of a revolving armature, field-magnets for producing a field in the vicinity of the armature, means for shifting the armature relative to the field-magnets or vice versa for producing a variation in the inductive relation between the armature and the field-magnets, and a counterbalancing device for counterbalancing the armature or field-magnets of the counter-electromotive-force generator so that the same may be easily moved.

3. The combination of a line-circuit, an electric power-motor in said circuit, a variable-counter-electromotive-force generator interposed in the line-circuit and generating a counter electromotive force opposed to the initial electromotive force of the line-circuit consisting of a revolving armature, field-magnets for producing a field in the vicinity of the armature, means for shifting the armature relative to the field-magnets or vice versa for producing a variation in the inductive relation between the armature and the field-magnets, and switch devices for throwing the armature and field first into series and then into parallel connection whereby the greatest resistance is secured at starting.

4. In a regulator for electric motors, the combination of field-magnets and armature relatively movable with respect to each other, devices to move one of the parts to vary its inductive relation to the other part, and switch devices movable with the movable part for decreasing the resistance after the armature has begun to rotate.

5. In a regulator for electric motors, the combination of field-magnets, an armature relatively movable with respect to the field-magnets, devices to move the armature to vary its inductive relation to the field-magnets, and switch devices movable with the armature for decreasing the resistance after the armature has begun to rotate by first coupling the armature in series with the field and then throwing the armature in parallel.

6. In a regulator for controlling the speed and power of an electric motor, the combination of field-magnets, an armature adapted to rotate freely within the field, a frame in which the armature is journaled, guides for the frame whereby it and the armature may be moved relatively to the field-magnets for shifting the armature into and out of the poles to the field-magnets, hand-operated devices for moving the armature and its frame, and electric circuits for connecting the armature with the motor to be regulated and for energizing the field-magnets of the regulator.

7. In a regulator for controlling the speed and power of an electromotor, the combination of field-magnets, an armature adapted to rotate freely within the field, a frame in which the armature is journaled, guides for the frame whereby it and the armature may be moved relatively to the field-magnets for shifting the armature into and out of the poles of the field-magnets, and hand-operated devices consisting of a rack and pinion for moving the frame and armature.

8. In an electric regulator for controlling the speed of motors, the combination of stationary field-magnets, a vertically-arranged armature free to revolve in said field-magnets, a frame in which said armature is journaled movable vertically relatively to the field-magnets, hand-operated devices for moving said frame vertically, and electric circuits for maintaining the armature and field-magnets in electrical circuit during the movements of the armature relatively to the field.

9. In an electric regulator for controlling the speed of motors, the combination of stationary field-magnets, a vertically-arranged armature free to revolve in said field-magnets, a frame in which said armature is journaled movable vertically relatively to the field-magnets, hand-operated devices for moving said frame vertically, electric circuits for maintaining the armature and field-magnets in electrical circuit during the movements of the armature relatively to the field, and a vertically-movable switch device for controlling the current flowing through the armature moved by the movable frame carrying the armature.

10. In an electric regulator for controlling the speed of motors, the combination of stationary field-magnets, a vertically-arranged armature free to revolve in said field-magnets, a frame in which said armature is journaled movable vertically relatively to the field-magnets, hand-operated devices for moving said frame vertically, electric circuits for maintaining the armature and field-magnets in electrical circuit during the movements of the armature relatively to the field, and a counterbalancing device for counterbalancing the weight of the armature and vertically-moving frame.

11. In a regulator for electric motors, the combination of a magnetic field, a revolving element composed of electrical conductors adapted to freely revolve within said field, hand-controlled devices for varying the speed of revolution of said revolving element, electric circuits for connecting the revolving element in electrical connection with the motor to be controlled, and a switch controlled by the hand-controlled devices for opening and closing the electric circuits whereby the said hand-controlled devices may close the circuit through the revolving element for the purpose of generating and controlling a counter electromotive force for the purpose of regulating the speed of the power-motor.

12. The combination of positive and negative conductors supplying current of constant potential a power-motor arranged in said circuit, a revolving electromagnetic element in series with said power-motor, a magnetic field in the vicinity of said revolving electromagnetic element, and a switch for controlling the current delivered to the electromagnetic element and also for varying its speed of revolution, whereby the current may be turned on to the power-motor and regulated by the variable counter electromotive force.

In testimony of which invention I have hereunto set my hand.

R. M. HUNTER.

Witnesses:
ERNEST HOWARD HUNTER,
HELEN L. MOTHERWELL.